(12) United States Patent
Kanamaru et al.

(10) Patent No.: US 6,438,745 B1
(45) Date of Patent: Aug. 20, 2002

(54) PROGRAM CONVERSION APPARATUS

(75) Inventors: Tomokazu Kanamaru, Moriguchi; Nobuki Tominaga, Kyoto, both of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/420,870

(22) Filed: Oct. 18, 1999

(30) Foreign Application Priority Data

Oct. 21, 1998 (JP) .......................................... 10-299553

(51) Int. Cl.[7] ................................................ G06F 9/45
(52) U.S. Cl. ........................................ 717/137; 717/163
(58) Field of Search ......................... 717/137, 141–146, 717/149, 151–167, 114–119, 148; 704/1–10; 707/6, 10

(56) References Cited

U.S. PATENT DOCUMENTS 5,590,331 A * 12/1996 Lewis et al. ................ 717/144
6,063,128 A * 5/2000 Bentlet et al. ................ 703/6
6,247,066 B1 * 6/2001 Tanaka ....................... 709/320

FOREIGN PATENT DOCUMENTS

JP                122876 A * 4/2000 ............. G06F/9/45

* cited by examiner

Primary Examiner—Gregory Morse
Assistant Examiner—Hoang-Vu Antony Nguyen-Ba
(74) Attorney, Agent, or Firm—Price and Gess

(57) ABSTRACT

A program conversion apparatus includes: a library call instruction detecting unit for detecting each library call instruction included in an inputted object program, the library call instruction calling a source library that is an external program module; a library correspondence table that gives various information, such as correspondence between arguments of source libraries and arguments of target libraries that have the same feature as the source libraries and are called by an outputted object program; a library call instruction generating unit for converting the detected library call instruction into an instruction that calls a target library corresponding to the source library and converting instructions for setting the arguments of the source library into instructions for setting arguments of the target library by referring to the library correspondence table.

10 Claims, 14 Drawing Sheets

FIG. 5

FUNCTION ADDING STATE INFORMATION

| IDENTIFICATION INFORMATION | ADDING STATE |
|:---:|:---:|
| #Fo1 | NOT ADDED |
| #Fo2 | ADDED |
| #Fo3 | NOT ADDED |
| #Fo4 | NOT ADDED |
| | |

FIG. 11

| | |
|---|---|
| SOURCE LIBRARY IDENTIFICATION INFORMATION | #12 |
| SOURCE LIBRARY ARGUMENT INFORMATION | int, int, int, int |
| SOURCE LIBRARY RETURN VALUE INFORMATION | int |
| TARGET LIBRARY IDENTIFICATION INFORMATION | #18 |
| TARGET LIBRARY ARGUMENT INFORMATION | long, long, long, long |
| TARGET LIBRARY RETURN VALUE INFORMATION | boolean |

FIG. 12

```
public static int field_draw()
{
    int i, j;
    int dx, dy;

for (i=1; i < 15; i++) {
        for (j =1; j < 15; j++) {
            dx = j * 7;
            dy = i * 7;
            if ((drawer. gvsquare( dx, dy, dx+7, dy+7)) !=0 )
                return 1 ;
        }
    }
    return 0 ;
}
```

FIG. 13

```
Method int field_draw()
   0  iconst_1
   1  istore_0
   2  goto *50
   5  iconst_1
   6  istore_1
   7  goto *41
  10  iload_1
  11  bipush 7
  13  imul
  14  istore_2         // dx = i*7 COMPLETED
  15  iload_0
  16  bipush 7
  18  imul
  19  istore_3         // dy = j*7 COMPLETED
  20  iload_2          // FIRST ARGUMENT dx IS PUSHED ONTO OPERAND STACK
  21  iload_3          // SECOND ARGUMENT dy IS PUSHED ONTO OPERAND STACK
  22  iload_2
  23  bipush 7
  25  iadd             // THIRD ARGUMENT dx+7 IS PUSHED ONTO OPERAND STACK
  26  iload_3
  27  bipush 7
  29  iadd             // FOURTH ARGUMENT dy+7 IS PUSHED ONTO OPERAND STACK
  30  invokestatic #12 <Method int gv_square(int, int, int, int)>
                       // METHOD IS CALLED
                       // RETURN VALUE IS PUSHED ONTO OPERATION STACK
  33  ifeq *38         // RETURN VALUE IS DIRECTLY USED
  36  iconst_1
  37  ireturn
  38  iinc 1 1
  41  iload_1
  42  bipush 15
  44  if_icmpit *10
  47  iinc 0 1
  50  iload_0
  51  bipush 15
  53  if_icmplt *5
  56  iconst_0
  57  ireturn
```

FIG. 14

```
Method int field_draw()
    0   iconst_1
    1   istore_0
    2   goto *55
    5   iconst_1
    6   istore_1
    7   goto *46
   10   iload_1
   11   bipush 7
   13   imul
   14   istore_2           // dx = i*7 COMPLETED
   15   iload_0
   16   bipush 7
   18   imul
   19   istore_3           // dy = j*7 COMPLETED
   20   iload_2            // FIRST ARGUMENT dx IS PUSHED ONTO OPERAND STACK
   21   itol               // TYPE OF FIRST ARGUMENT IS CONVERTED FROM int TYPE TO long TYPE
   22   iload_3            // SECOND ARGUMENT dy IS PUSHED ONTO OPERAND STACK
   23   itol               // TYPE OF SECOND ARGUMENT IS CONVERTED FROM int TYPE TO long TYPE
   24   iload_2
   25   bipush 7
   27   iadd               // THIRD ARGUMENT dx+7 IS PUSHED ONTO OPERAND STACK
   28   itol               // TYPE OF THIRD ARGUMENT IS CONVERTED FROM int TYPE TO long TYPE
   29   iload_3
   30   bipush 7
   32   iadd               // FOURTH ARGUMENT dy+7 IS PUSHED ONTO OPERAND STACK
   33   itol               // TYPE OF FOURTH ARGUMENT IS CONVERTED FROM int TYPE TO long TYPE
   34   invokestatic #18   <Method boolean gv_fine_square(long, long, long, long)>
                           // METHOD IS CALLED
                           // RETURN VALUE IS PUSHED ONTO OPERATION STACK
   37   btoi               // TYPE OF RETURN VALUE IS CHANGED FROM boolean TYPE TO int TYPE
   38   ifeq *43
   41   iconst_1
   42   ireturn
   43   iinc 1 1
   46   iload_1
   47   bipush 15
   49   if_icmpit *10
   52   iinc 0 1
   55   iload_0
   56   bipush 15
   58   if_icmplt *5
   61   iconst_0
   62   ireturn
```

PROGRAM CONVERSION APPARATUS

This application is based on application No. H10-299553 filed in Japan, the content of which is hereby incorporated by reference.

BACKGROUND OF THE INVENTION

1. Field of the Invention

The present invention relates to a program conversion apparatus, and in particular to a so-called binary translator which converts an object program that is designed to run in a given execution environment into an object program that can run in a different execution environment.

2. Background Art

Binary translators receive object programs that are designed to run on certain platforms, convert the received object programs into object programs that can run on other platforms, and output the generated object programs. It should be noted here that the conversion of object programs means the generation of outputted programs from inputted object programs.

Here, the term "object program" means a program in the executable format on a certain platform, such as a program that includes machine instructions generated by compiling a source program written in a high-level language. Also, the term "platform" means a basic environment in which an object program is executed, such as a real processor, basic functions of an OS (operating system), and a virtual machine.

The selection of a platform is an important concern in the design of a computer system or a home appliance, since this places various restrictions, such as the instruction format, on the object programs that will run on such system. To generate object programs that satisfy these restrictions, a compiler that converts a source program written in a high-level language into an intermediate representation and converts the intermediate representation into an object program that conforms to a target platform may be used.

A conventional binary translator uses similar techniques to a compiler to convert an object program into an object program that satisfies the restrictions of the target platform. That is, a conventional binary translator converts an inputted program into an intermediate representation which includes contents of instructions and data that are extracted from the inputted program, and generates an object program that conforms to the target platform according to the intermediate representation.

As new program development techniques have been devised, more and more object programs are now designed to call libraries. As a result, certain object programs cannot run by themselves on platforms.

Here, the term "library" is a generic name for program modules that are external to object programs and can be called by the object programs. External program modules are, for instance, parts of OSs and function libraries including standard input-output functions of C language.

Object programs that include library calls pass arguments to call libraries, receive return values that are execution results from the libraries, and use the return values. Therefore, object programs are written so that they meet the conditions and requirements concerning arguments and return values for the libraries called by the object programs.

As a result, in recent years, the execution environments of object programs have come to include libraries in addition to platforms that are conventionally included in the execution environments.

Therefore, the conversion by conventional binary translators is not effective when the execution environments for object programs outputted from the binary translators does not include the same libraries as the execution environments for object programs before the conversion by the binary translators. Note that the same libraries before and after the conversion means libraries that are the same except for differences caused by the differences between platforms.

In other words, even if the conventional binary translators that are designed to overcome the differences between platforms are used to convert inputted object programs into other object programs corresponding to target platforms, the generated object programs cannot be executed due to the lack of the called library.

SUMMARY OF THE INVENTION

In view of the stated problems, the object of the present invention is to provide a program conversion apparatus (a binary translator) for converting an inputted object program that calls libraries into an outputted object program that runs in an execution environment which includes libraries that are different from the libraries called by the inputted object program.

The stated object is achieved by a program conversion apparatus for converting a first object program that runs on a first platform into a second object program that runs on the second platform, the first object program including source library call instructions that call source libraries, the source libraries being external modules that are designed to run on the first platform, the program conversion apparatus including: a library correspondence information storing unit for holding library correspondence information that associates the source libraries with target libraries and includes argument correspondence information, where the target libraries are external modules each of which is capable of running on the second platform and has the same feature as one of the source libraries, and the argument correspondence information shows a correlation between conditions required by source arguments and conditions required by target arguments, the source arguments being arguments of the source libraries and the target arguments being arguments of the target libraries; a library call instruction detecting unit for detecting a source library call instruction included in the first object program; an instruction converting unit for converting the detected source library call instruction into a target library call instruction by referring to the library correspondence information, where the target library call instruction is to be included in the second object program and calls a target library corresponding to a source library called by the detected source library call instruction; an argument setting instruction detecting unit for detecting an argument setting instruction included in the first object program, the argument setting instruction setting a value in a source argument of the called source library; and an argument setting instruction converting unit for converting the detected argument setting instruction into a target argument setting instruction by referring to the argument correspondence information, where the target argument setting instruction is to be included in the second object program and sets the value set in the source argument of the called source library as a target argument of the corresponding target library to meet a condition required by the target argument of the corresponding target library.

The following is the explanation of the reason why the stated object is achieved by the program conversion apparatus having this construction.

In some cases, even if the same libraries as the source libraries called by the first object program do not exist on the second platform, target libraries that have the same features as the source libraries exist on the second platform. It should be noted here that in this specification, the term "same features" of libraries means the same functions of the libraries. For instance, when libraries having the same features are executed, the same execution results are obtained. In other words, there are cases where even if the same libraries as the source libraries called by the first object program do not exist on the second platform, the execution environment of the first object program is similar to that of the second object program. An example of such is where to perform a general function of displaying a character sequence on a screen, a source library receives (1) a pointer specifying a memory area for storing the character string as the first argument and (2) 1-byte data showing the number of bytes of the character string as the second argument, and a target library receives (a) 2-byte data showing the number of bytes of the character string as the first argument and (b) a pointer specifying a memory area for storing the character string as the second argument.

In this case, there are various differences between the source library and target library, such as the difference in the interface between an object program and libraries, the difference in the number of arguments, difference in the number assigned to each argument, and the difference in the data type of each argument. The program conversion apparatus of the present invention overcomes these differences, thereby achieving the stated object.

When the second platform does not include the target library having the same feature as a source library, the target library may be generated and exist on the second platform, or the target library may be included in the second object program as an internal module. To include the internal module in the second object program, the difference in interface between an object program and libraries needs to be overcome. There are some cases where new target libraries that are the same as source libraries cannot be generated. This is because, in some cases, target libraries which each include the features of a plurality of similar source libraries needs to be generated to efficiently use memories, and the variation of data types that can be dealt with by processors are limited due to various factors such as the poor performances of the processors.

Here, the argument correspondence information may include target argument type information showing data types that are the conditions required by the target arguments and source argument type information showing data types that are the conditions required by the source arguments, and the argument setting instruction converting unit may convert, by referring to the target argument type information and source argument type information, the detected argument setting instruction into the target argument setting instruction, where the target argument setting instruction converts a data type of the value set by the detected argument setting instruction into a data type of the target argument of the corresponding target library shown by the target argument type information and sets the value of the converted data type as the target argument of the corresponding target library.

With this construction, even if the data type of a source argument is different from that of a target argument, the program conversion apparatus of the present invention overcomes the difference in the data types by converting the data type of the source argument into that of the target argument. Therefore, an object program including library call instructions for calling source libraries is appropriately converted into an object program that calls target libraries.

The stated object is also achieved by a program conversion apparatus for converting a first object program that runs on a first platform into a second object program that runs on the second platform, the first object program including source library call instructions that call source libraries, the source libraries being external modules that are designed to run on the first platform, the program conversion apparatus including: a library correspondence information storing unit for holding library correspondence information that associates the source libraries with target libraries and includes argument correspondence information, where the target libraries are external modules each of which is capable of running on the second platform and has the same feature as one of the source libraries, and the argument correspondence information shows a correlation between conditions required by source arguments and conditions required by target arguments, the source arguments being arguments of the source libraries and the target arguments being arguments of the target libraries; a library call instruction detecting unit for detecting a source library call instruction included in the first object program; an instruction converting unit for converting the detected source library call instruction into a target library call instruction by referring to the library correspondence information, where the target library call instruction is to be included in the second object program and calls a target library corresponding to a source library called by the detected source library call instruction; an argument setting instruction detecting unit for detecting an argument setting instruction included in the first object program, the argument setting instruction setting a value in a source argument of the called source library; an argument setting instruction converting unit for converting the detected argument setting instruction into a target argument setting instruction by referring to the argument correspondence information, where the target argument setting instruction is to be included in the second object program and sets the value set in the source argument of the called source library as a target argument of the corresponding target library to meet a condition required by the target argument of the corresponding target library; and an internal module linking unit for linking the corresponding target library with the second object program as an internal module.

With this construction, even if a library having the same feature as a source library does not exist on the second platform, the library is linked with the second object program as an internal module. Therefore, the second object program is executable on the second platform.

The stated object is further achieved by a program conversion apparatus for converting a first object program that runs on a first platform into a second object program that runs on the second platform, the first object program including source library call instructions that call source libraries, the source libraries being external modules that are designed to run on the first platform, the program conversion apparatus including: a library correspondence information storing unit for holding library correspondence information that associates the source libraries with target libraries and includes return value correspondence information, where the target libraries are external modules each of which is capable of running on the second platform and has the same feature as one of the source libraries, and the return value correspondence information shows a correlation between attributes of source return values and attributes of target return values, the source return values being values returned from the source libraries and the target return values being values returned from the target libraries; a library call instruction detecting unit for detecting a source library call instruction included in the first object program; an instruction converting unit for converting the detected source library call instruction into a target library call instruction by referring to the library correspondence information, where the target library call instruction is to be included in the second object program and calls a target library corresponding to a source library called by the detected source library call instruction; a return value using instruction detecting unit for detecting a return value using instruction included in the first object program, the return value using instruction using a source return value returned from the called source library; and a return value using instruction converting unit for converting the detected return value using instruction into a target return value using instruction by referring to the return value correspondence information, where the target return value using instruction is to be included in the second object program, converts a target return value returned from the corresponding target library to conform to an attribute of the returned source return value, and uses the converted target return value.

With this construction, even if the attributes of return values returned from source libraries are different from those of return values returned from target libraries, the second object program is executable on the second platform.

Here, the return value correspondence information may include source return value type information showing data types that are the attributes of the source return values and target return value type information showing data types that are the attributes of the target return values, and the return value using instruction converting unit may convert, by referring to the source return value type information and target return value type information, the detected return value using instruction into the target return value using instruction, where the target return value using instruction converts a data type of the target return value returned from the corresponding target library into a data type of the returned source return value shown by the source return value type information and uses the target return value of the converted data type.

With this construction, even if the attributes of return values returned from source libraries are different from those of return values returned from target libraries, the attributes of the source return values are converted into those of the target return values. Therefore, an object program including library call instructions for calling source libraries is appropriately converted into an object program that calls target libraries.

As described above, the program conversion apparatus of the present invention overcomes the difference between execution environments, which is to say the difference between external program modules called by object programs, in addition to the difference between platforms. Therefore, the program conversion apparatus of the present invention converts an inputted object program into an outputted object program that can run in a target execution environment. As a result, the present invention has great practical uses.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows an example of the function adding state information held by a function adding state information storing unit 180;

FIG. 11 shows the library correspondence table of a modified program conversion apparatus;

FIG. 12 shows a source program written in the Java language;

FIG. 13 shows a Java byte code; and

FIG. 14 shows a program generated by the modified program conversion apparatus.

DESCRIPTION OF THE PREFERRED EMBODIMENT

An embodiment of the program conversion apparatus of the present invention is described below with reference to the figures.

<Construction>

Figure 1:
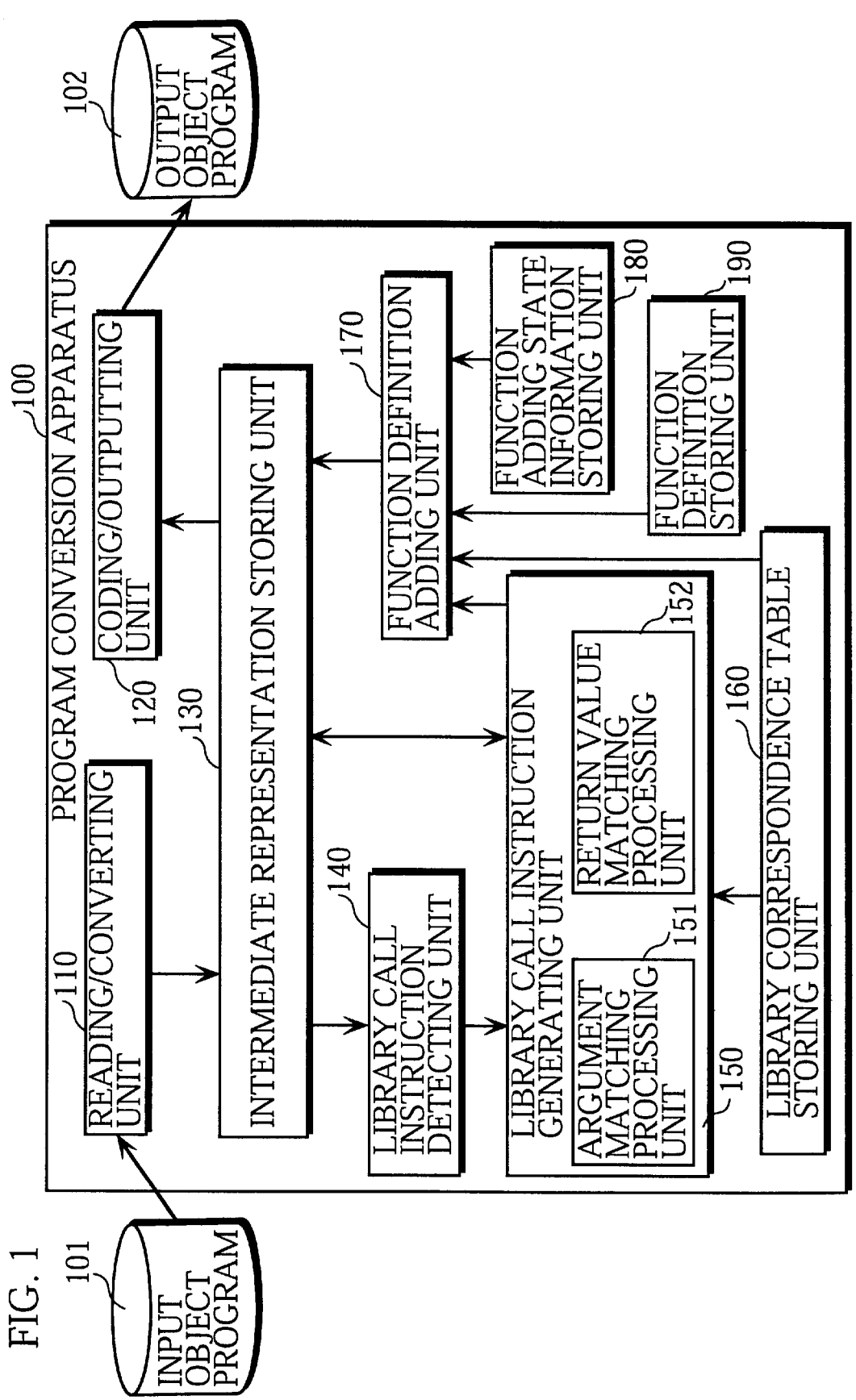
FIG. 1 shows the construction of the program conversion apparatus of an embodiment.

FIG. 1 shows the construction of the program conversion apparatus of this embodiment.

The program conversion apparatus 100 is a binary translator that generates an outputted object program 102 by referring to an inputted object program 101. The program conversion apparatus 100 includes a CPU and a memory as its hardware elements and converts the inputted object program 101 into the outputted object program 102 by executing the control program stored in the memory using the CPU.

The program conversion apparatus 100 functionally includes a reading/converting unit 110, a coding/outputting unit 120, an intermediate representation storing unit 130, a library call instruction detecting unit 140, a library call instruction generating unit 150, a library correspondence table storing unit 160, a function definition adding unit 170, a function adding state information storing unit 180, and a function definition storing unit 190.

The intermediate representation storing unit 130 is an area of the memory for storing an intermediate representation. Here, the intermediate representation means an internal representation of an object program in the program conversion apparatus 100.

The reading/converting unit 110 decodes instructions of the inputted object program 101, converts the decoded instructions into an intermediate representation, and stores the intermediate representation in the intermediate representation storing unit 130. Here, the intermediate representation generated by the reading/converting unit 110 is equivalent to an intermediate representation generated by a conventional binary translator. A more detailed explanation of intermediate representations is given in "Compiler Principles, Techniques, and Tools" (Alferd V. Aho, RaviSethi, and Jeffrey D. Ullman, pub. Addison-Wesley, 1986).

The coding/outputting unit 120 converts the intermediate representation stored in the intermediate representation storing unit 130 into machine instructions and outputs the machine instructions as the outputted object program 102.

The library call instruction detecting unit 140 detects each library call instruction in the intermediate representation stored in the intermediate representation storing unit 130. Here, the library call instruction means an instruction that calls a library function from the inputted object program 101. Note that the term "library function" means an external program module and each library function is hereinafter referred to as a library.

It should be noted here that the reading/converting unit 110, the coding/outputting unit 120, and the intermediate representation storing unit 130 are the same as those of a conventional program conversion apparatus.

The library correspondence table storing unit 160 includes a source library table and a target library table. The source library table gives information, such as identification information, for each library that runs on a platform of the inputted object program 101 (hereinafter referred to as a "source library"). The target library table gives information, such as identification information, for each library which corresponds to a source library, has the same feature as the source library, and runs on a target platform (hereinafter referred to as a "target library"). The source library table and the target library table are together hereinafter referred to as a library correspondence table. The library correspondence table is described in detail later. Note that each library that exists on a platform of the inputted object program 101 but does not exist on a target platform is hereinafter referred to a target function.

The library call instruction generating Unit 150 converts each library call instruction in the intermediate representation detected by the library call instruction detecting unit 140 into an instruction that calls a target library corresponding to the source library called by the detected library call instruction. When doing so, the library call instruction generating unit 150 refers to the library correspondence table stored in the library correspondence table storing unit 160. The library call instruction generating unit 150 includes an argument matching processing unit 151 and a return value matching processing unit 152. The argument matching processing unit 151 converts an instruction for setting an argument necessary for a source library into an instruction for setting an argument necessary for the corresponding target library. The return value matching processing unit 152 converts an instruction that uses a return value returned from a source library into an instruction that uses a return value from the corresponding target library.

The function definition storing unit 190 is an area of the memory for storing target functions having the same features as source libraries. The function definition storing unit 190 stores the target functions in an intermediate representation form.

The function adding state information storing unit 180 holds function adding state information that shows which of the target functions stored in the function definition storing unit 190 are added to the intermediate representation of the object program stored in the intermediate representation storing unit 130.

The function definition adding unit 170, when the library call instruction generation unit 150 converts a library call instruction into an instruction for calling a target function, adds the definition of the target function to the object program. Note that the function definition adding unit 170 avoids a situation where the definition of the same target function is repeatedly added to the object program by referring to the function adding state information held by the function adding state information storing unit 180.

<Library Correspondence Table>

The following is a description of the construction of the library correspondence table. The library correspondence table includes the source library table 400 and the target library table 500.

Figure 2:
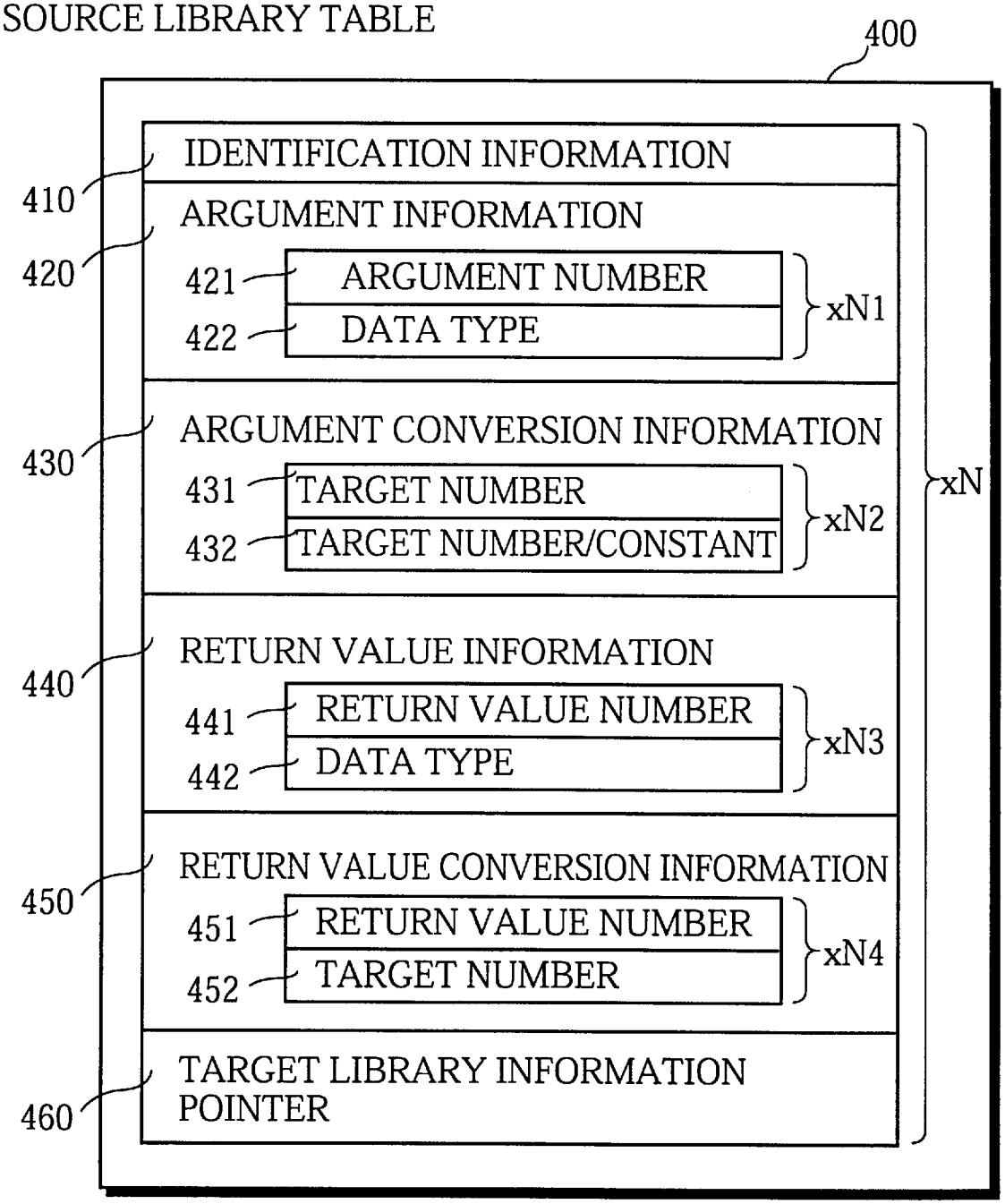
FIG. 2 shows the construction of a source library table 400.

FIG. 2 shows the construction of the source library table 400.

The source library table 400 gives source library information for each source library. The source library information includes identification information 410, argument information 420, argument conversion information 430, return value information 440, return value conversion information 450, and a target library information pointer 460. In this drawing, each of the legends N, N1, N2, N3, and N4 indicates that there are a plurality of pieces of information.

The identification information 410 is the identification number that is assigned to a source library.

The argument information 420 includes N1 pairs of an argument number 421 and a data type 422, where N1 is the number of arguments of the source library. Here, the data type 422 shows the data size of an argument necessary for the source library and is 1-byte type, 2-byte type, 4-byte type, or the like. When a stack pointer specifies an address of the memory area in which all arguments of the source library are stored and pairs of the argument number and the data type are (first, 2-byte type), (second, 4-byte type), and (third, 1-byte type), for instance, the source library deals with 2-byte data starting from the address specified by the stack pointer as its first argument, the following 4-byte data as its second argument, and the following 1-byte data as its third argument.

The argument conversion information 430 includes N2 pairs of a target number 431 and an argument number/constant 432, where N2 is the number of arguments of a target library corresponding to the source library. Here, the argument number/constant 432 is information showing data that can be used as an argument of the corresponding target library and gives the number assigned to an argument of the source library or a constant value. When pairs of the target number and the argument number/constant are (first, second), (second, "0"), and (third, first), for instance, the corresponding target library deals with the second argument of the source library as its first argument, the constant value "0" as its second argument, and the first argument of the source library as its third argument.

The return value information 440 includes N3 pairs of a return value number 441 and a data type 442, where N3 is the number of return values of the source library. Here, like the data type of an argument, the data type of a return value shows the data size of a return value stored by the source library and is 1-byte type, 2-byte type, 4-byte type, or the like.

The return value conversion information 450 includes N4 pairs of a return value number 451 and a target number 452, where N4 is the number of return values of the source library. This information shows which return value of the corresponding target library corresponds to a return value of the source library. When a pair of the return value number and the target number is (first, second), for instance, this pair shows that it is appropriate to convert an instruction for using the first return value of the source library into an instruction for using the second return value of the corresponding target library.

The target library information pointer 460 is a pointer specifying the location in the memory where target library information concerning the corresponding target library is stored.

Figure 3:
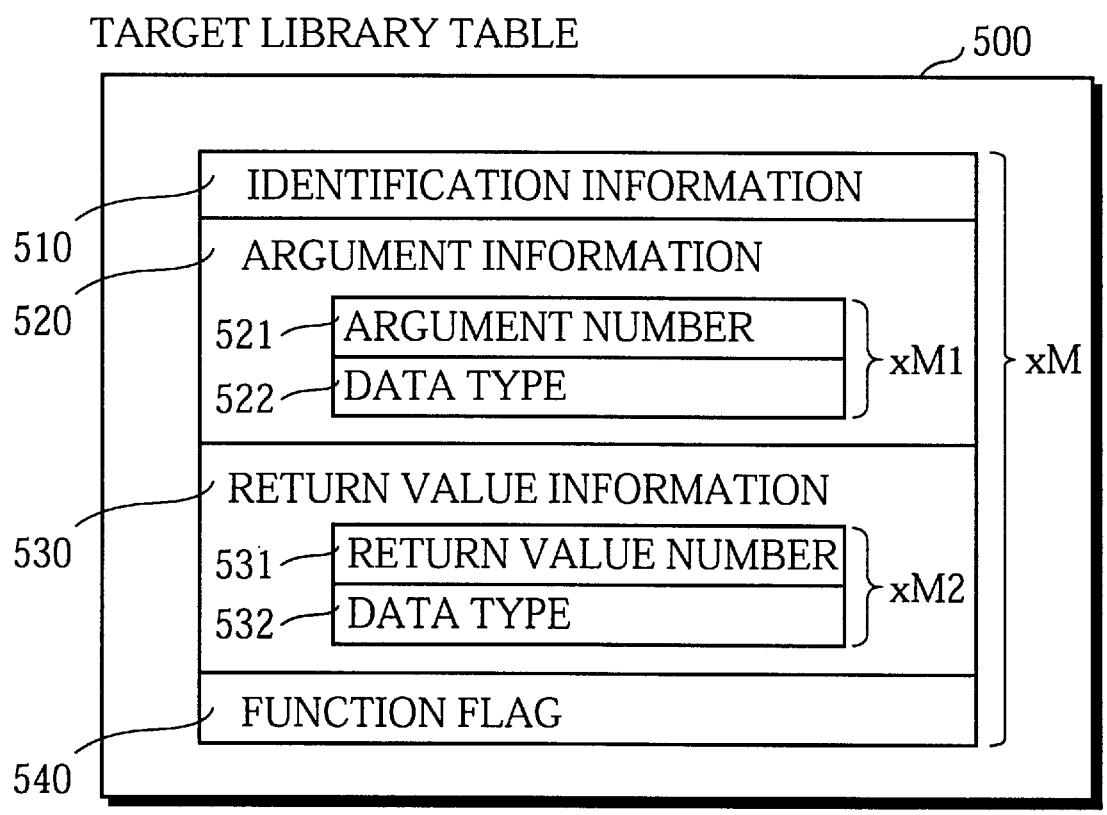
FIG. 3 shows the construction of a target library table 500.

FIG. 3 shows the construction of the target library table 500.

The target library table 500 gives target library information for each target library. The target library information includes identification information 510, argument information 520, return value information 530, and a function flag 540. In this drawing, each of the legends M, M1, and M2, indicates that there are a plurality of pieces of information.

The identification information 510 gives the identification number for identifying a target library.

The argument information 520 includes M1 pairs of an argument number 521 and a data type 522, where M1 is the number of arguments of the target library. Also, the return value information 530 includes M2 pairs of a return value number 531 and a data type 532, where M2 is the number of return values of the target library.

The function flag 540 is information showing whether the target library is a target function. When a target library is a target function, the library that is an external program module is not included in the program execution environment of the target platform. Therefore, as necessary, the program conversion apparatus 100 needs to include such a library into the outputted object program 102 as an internal module. On the other hand, when a target library is not a target function, the library is included in the program execution environment of the target platform. Therefore, such a library does not need to be included in the outputted object program 102.

Figure 4:
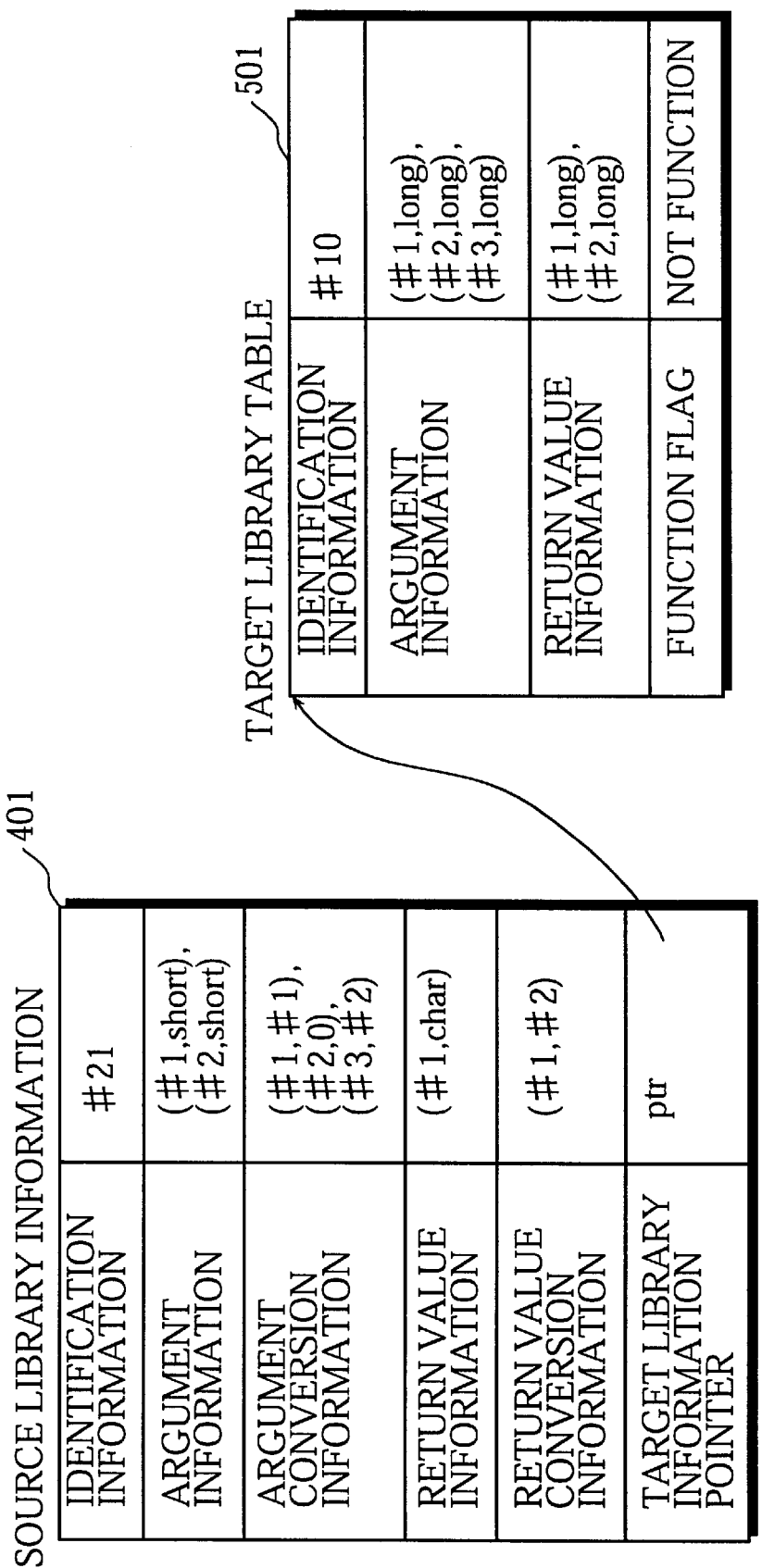
FIG. 4 shows an example of source library information and target library information.

FIG. 4 shows an example of the source library information and the target library information.

This drawing shows source library information 401 concerning the source library having the identification number "21" and target library information 501 concerning the target library that has a feature including the feature of the source library "21".

The target library in this example is included in the execution environment of the target platform and is not a target function. Accordingly, in this example, a target library that includes the feature of the source library "21" exists on the target platform.

Note that in this drawing, the legend "char" represents the 1-byte type, the legend "short" the 2-byte type, and the legend "long" the 4-byte type.

With this construction, the library correspondence table shows the correspondence between source argument conditions and target argument conditions. Here, the source argument conditions are the conditions of arguments for the source library (such arguments are hereinafter referred to as "source arguments"), and the target argument conditions are conditions of arguments for the target library (such arguments are hereinafter referred to as "target arguments"). Also, the library correspondence table shows the correspondence between source return value attributes and target return value attributes. Here, the source return value attributes are attributes of return values returned from the source library (such return values are hereinafter referred to as "source return values"), and the target return value attributes are attributes of return values returned from the target library (such return values are hereinafter referred to as "target return values"). Here, the condition of arguments of a library includes the number of arguments necessary for the library and includes the data type of the arguments. Also, the attribute of return values of a library includes the number of return values of the library and includes the data type of the return values.

<Function Adding State Information>

FIG. 5 shows an example of the function adding state information held by the function adding state information storing unit 180.

The function adding state information includes pairs of identification information and an adding state for each target function and shows whether each target function is added to the intermediate representation of an object program. This information is referred to and is renewed by the function definition adding unit 170.

<Operation>

The following description concerns the operation of the program conversion apparatus 100 having the stated construction.

Figure 6:
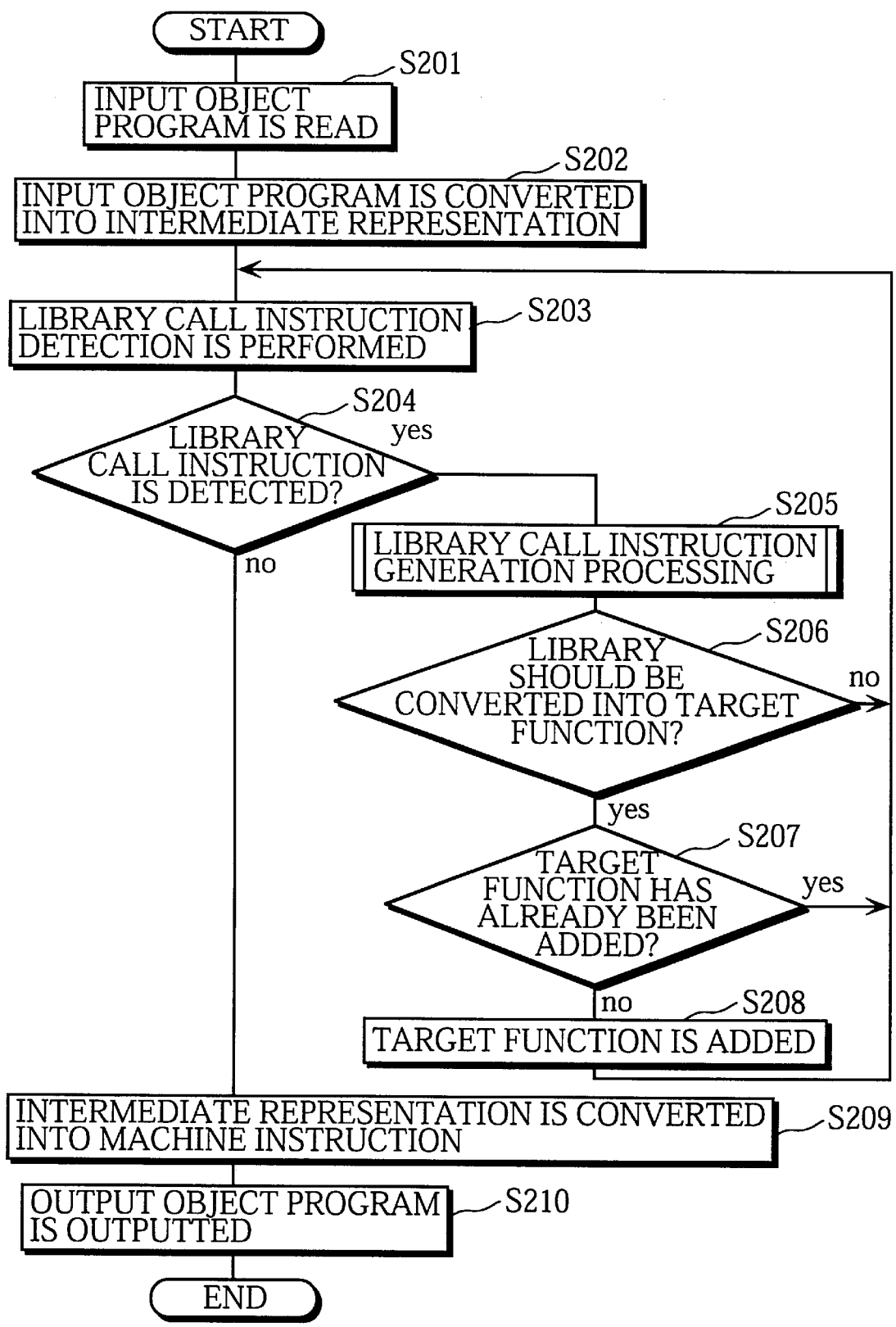
FIG. 6 is a flowchart showing the operation of a program conversion apparatus 100.

FIG. 6 is a flowchart showing the operation of the program conversion apparatus 100.

The reading/converting unit 110 reads the inputted object program 101 (step S201), converts the inputted object program 101 into an intermediate representation, and stores the intermediate representation in the intermediate representation storing unit 130 (step S202). The library call instruction detecting unit 140 detects a library call instruction in the intermediate representation (step S203).

When the library call instruction detecting unit 140 does not detect a library call instruction (step S204), the coding/outputting unit 120 converts the intermediate representation stored in the intermediate representation storing unit 130 into machine instructions (step S209) and outputs the machine instructions as the outputted object program 102 (step S210).

When the library call instruction detecting unit 140 detects a library call instruction (step S204), the library call instruction generating unit 150 performs library call instruction generation processing described later (step S205). When it is judged that the library called by the detected library call instruction should be converted into a target function (step S206), the function definition adding unit 170 refers to the function adding state information held by the function adding state information storing unit 130. When the target function has not yet been added to the intermediate representation held by the intermediate representation storing unit 130 (step S207), the function definition adding unit 170 adds the target function stored in the function definition storing unit 190 to the intermediate representation held by the intermediate representation storing unit 130 (step S208). Then, the process returns to step S203 to detect another library call instruction.

In step S207, when the function definition adding unit 170 judges that the target function has already been added to the intermediate representation held by the intermediate representation storing unit 130, step S208 is skipped and the process returns to step S203.

In step S206, when it is not judged that the library called by the detected library call instruction should be converted into a target function, steps S207 and S208 are skipped and the process returns to step S203.

The function definition adding unit 170, when a target function is newly stored in the intermediate expression storage unit 130, renews the function adding state information held by the function adding state information storing unit 180 to show that the target function has been added.

Figure 7:
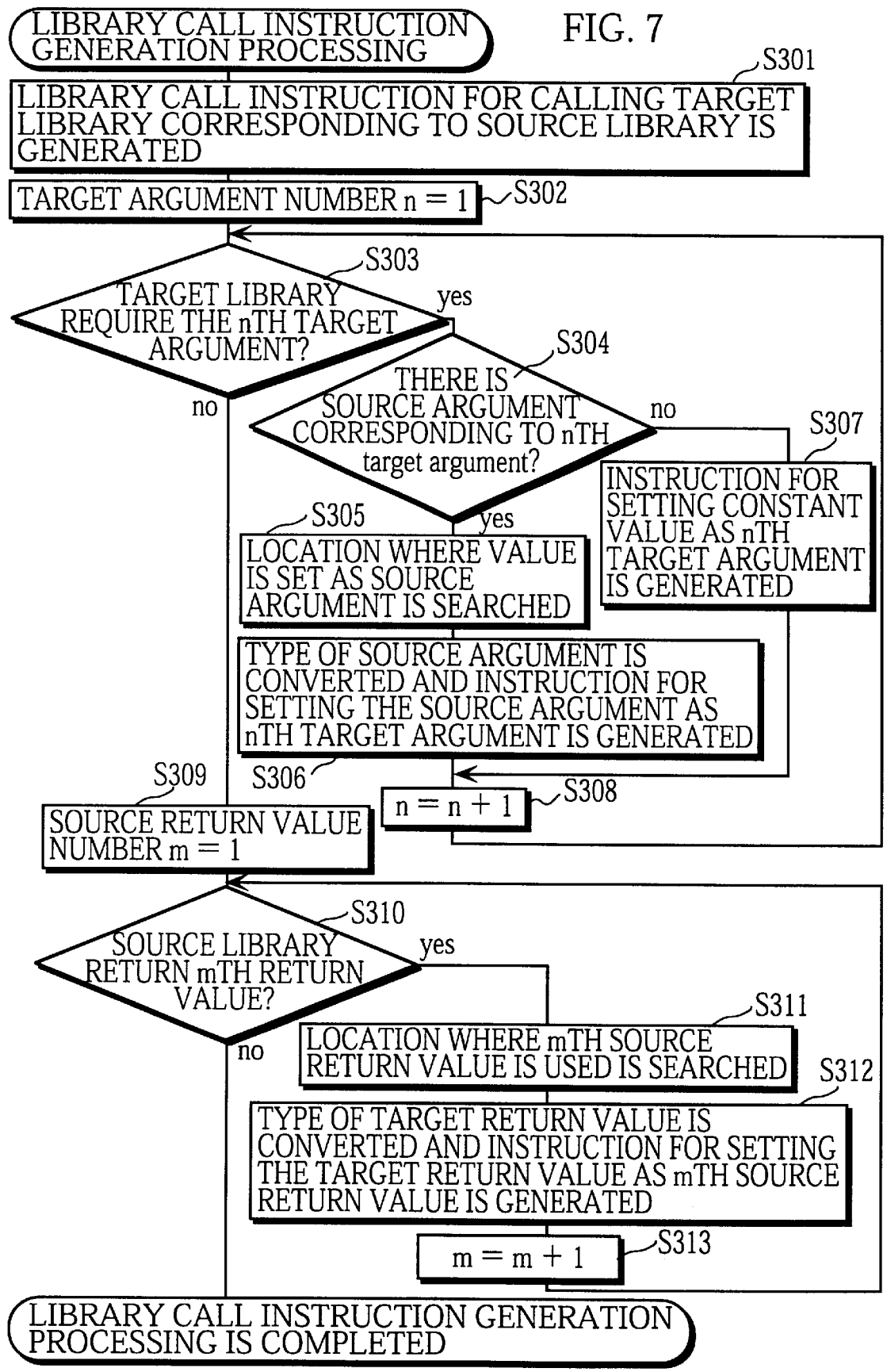
FIG. 7 is a flowchart showing library call instruction generation processing performed by a library call instruction generating unit 150.

FIG. 7 is a flowchart showing the library call instruction generation processing performed by the library call instruction generating unit 150. Here, the library call instruction generation processing includes the conversion of library call instructions, the conversion of argument setting instructions, and the conversion of return value using instructions.

The library call instruction generating unit 150 refers to the library correspondence table according to the identification number assigned to a source library given by the library call instruction detected by the library call instruction detecting unit 140. By doing so, the library call instruction generating unit 150 obtains the identification number assigned to a target library corresponding to the source library called by the detected library call instruction and generates a library call instruction for calling the target library (step S301). The generation of a library call instruction means the conversion of the identification number assigned to the source library called by a library call instruction detected by the library call instruction detecting unit 140 into the identification number assigned to a target library corresponding to the source library.

After a library call instruction is generated, the argument matching processing unit 151 converts instructions for setting arguments (steps S302–S308) and the return value matching processing unit 152 converts instructions for using return values (steps S309–S313).

More specifically, the argument matching processing unit 151 sets the variable "n" showing the number assigned to a target argument to one (step S302) and judges whether the target library requires the nth target argument by referring to the argument conversion information included in the source library information stored in the library correspondence table storing unit 160 (step S303). If the judgement result in step S303 is affirmative, it is judged whether the argument conversion information gives the number assigned to a source argument corresponding to the nth target argument, that is, whether the nth target argument corresponds to a source argument (step S304). If the judgement result in step S304 is affirmative, the argument matching processing unit 151 searches the intermediate representation for the location here the source argument is defined, that is, the location here a value is set as the source argument (step S305).

When doing so, the argument matching processing unit 151 refers to the UD (Use-Define) information concerning the intermediate representation. Note that the UD information is generated by the program conversion apparatus 100 by referring to the intermediate representation that is generated from the inputted object program and is stored in the intermediate representation storing unit 130. The UD information associates identifiers, such as variable names, which each uniquely specify a variable included in the intermediate representation with information showing the locations where the variables are defined.

Figure 8:
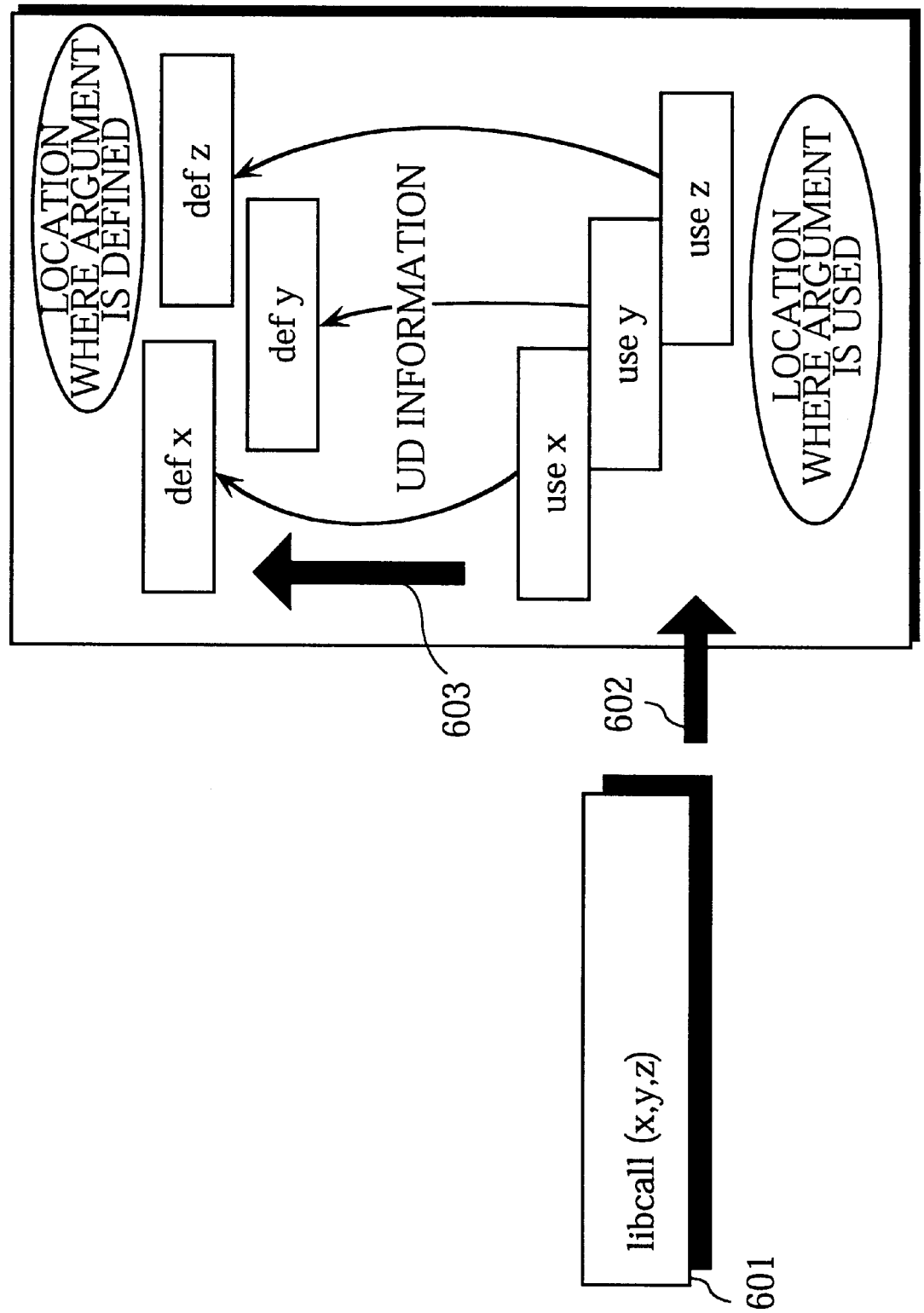
FIG. 8 shows a state where the intermediate representation is searched for the location where arguments are defined according to UD information.

FIG. 8 shows a state where, according to the UD information, the intermediate representation is searched for the locations where arguments are defined.

The argument matching processing unit 151 specifies each argument by referring to a library call description 601 (arrow 602) and specifies the location where the specified argument is defined by referring to the UD information according to the specified argument (arrow 603). That is, the argument matching processing unit 151 specifies the locations where values are set in variables that are used as the specified arguments in the intermediate representation.

After the location where the source argument is defined is specified, the argument matching processing unit 151 converts the type of the value that is set as the source argument at the specified location and generates an instruction for setting the value of the converted type as the nth target argument (step S306). When doing so, the argument matching processing unit 151 refers to the argument information of the source library information and the target library information.

If the judgement result in step S304 is negative and the argument conversion information designates a constant value for the nth target argument, the argument matching processing unit 151 generates an instruction for setting the constant value as the nth target argument (step S307). After the processing in step S306 or step S307 is performed, the value of the variable "n" is incremented by one and the process returns to step S303 (step S308).

When the target library does not require the nth target argument in step S303, the argument matching processing unit 151 terminates the conversion of argument setting instructions.

The return value matching processing unit 152 sets the variable "m" showing the number assigned to a source return value to one (step S309) and judges whether the source library returns the mth source return value by referring to the return value conversion information included in the source library information stored in the library correspondence table storing unit 160 (step S310). If the judgement result in step S310 is affirmative, the return value matching processing unit 152 searches the intermediate representation for the location where the mth source return value is used (step S311).

When doing so, the return value matching processing unit 152 refers to the DU (Define-Use) information concerning the intermediate representation. Note that the DU information is generated by the program conversion apparatus 100 by referring to the intermediate representation that is generated from the inputted object program and is stored in the intermediate representation storing unit 130. The DU information associates identifiers, such as variable names, which each uniquely specify a variable included in the intermediate representation with information showing the locations where the variables are used.

Figure 9:
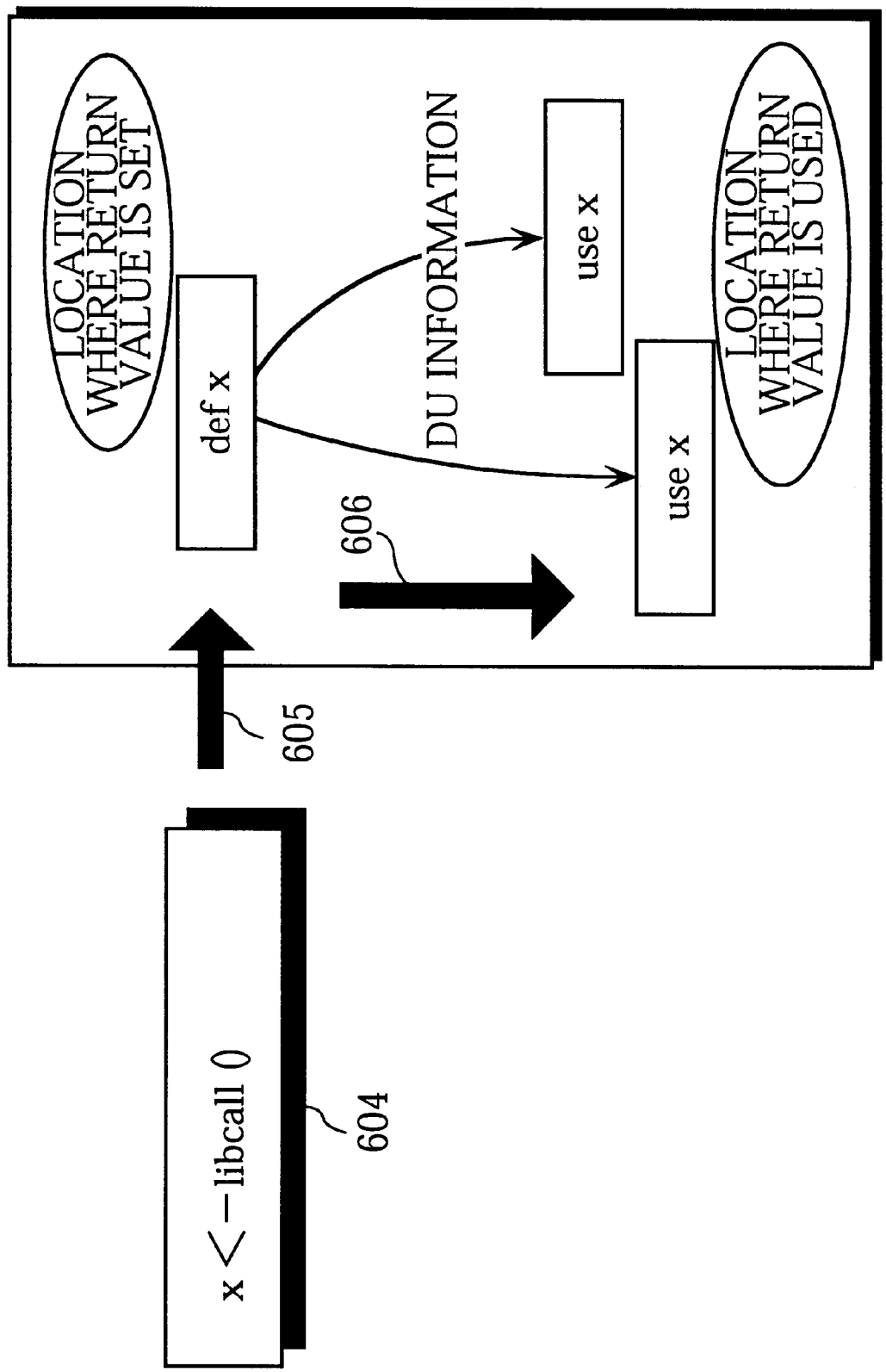
FIG. 9 shows a state where the intermediate representation is searched for the location where a return value is used according to DU information.

FIG. 9 shows a state where the intermediate representation is searched for the location where a return value is used according to the DU information.

The return value matching processing unit 152 specifies each return value by referring to a library call description 604 (arrow 605) and specifies the location where the specified return value is used by referring to the DU information according to the specified return value (arrow 606). That is, the return value matching processing unit 152 specifies the locations where the return values are set in variables that are included in the intermediate representation and correspond to the return values.

After the location where the source return value is used is specified, the return value matching processing unit 152 converts the type of a target return value corresponding for the mth source return value and generates an instruction for setting the target return value of the converted type as the mth source return value in a corresponding variable (step S312). When doing so, the return value matching processing unit 152 refers to the return value information of the source library information and the target library information. Then the value of the variable "m" is incremented by one and the process returns to step S310 (step S313).

If it is not judged that the source library returns the mth source return value in step S310, the return value matching processing unit 152 terminates the conversion of return value using instructions.

The library call instruction generation processing is described below in detail using a specific example.

Figure 10:
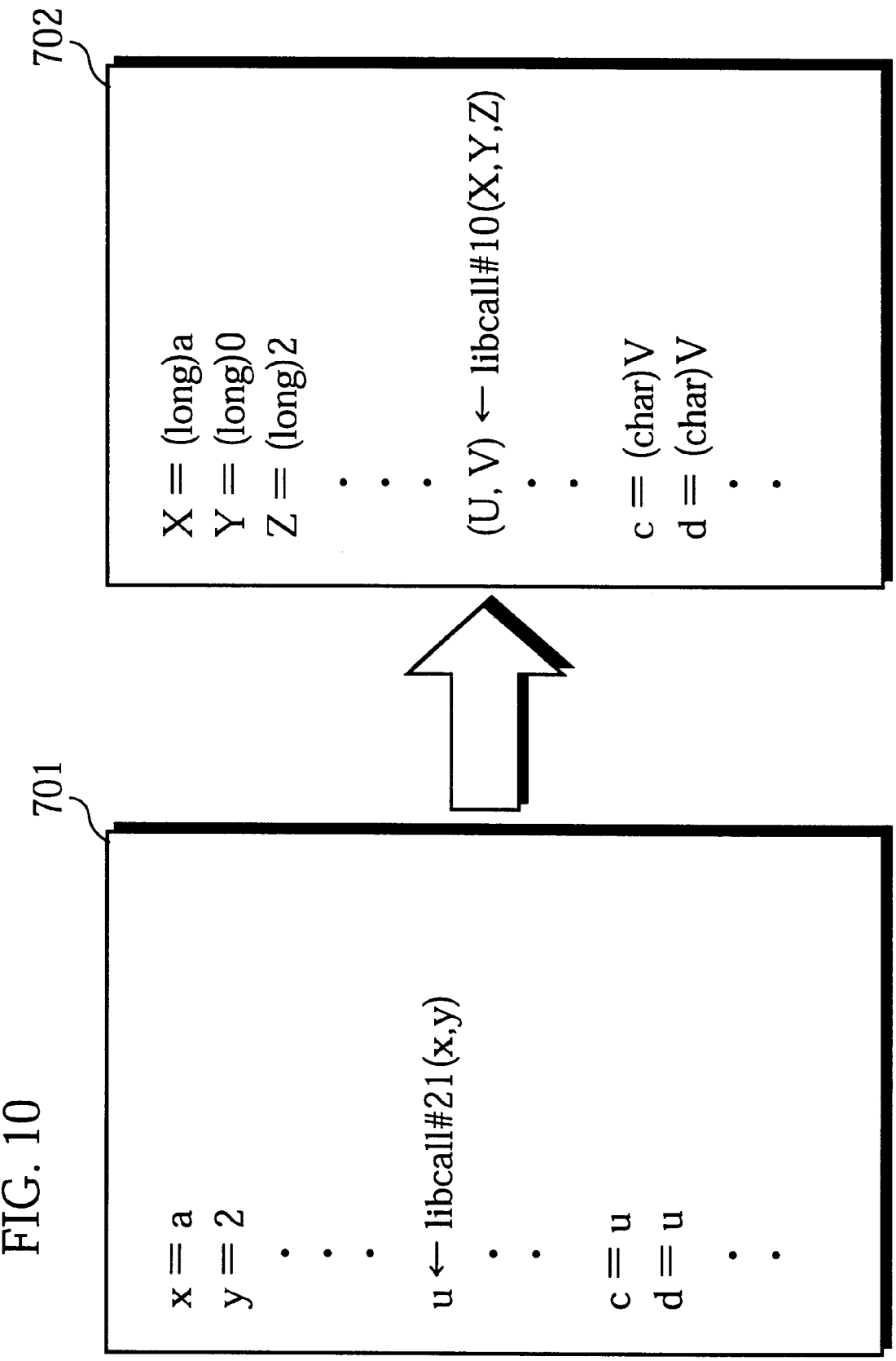
FIG. 10 shows the states of the intermediate representations before and after library call instruction generation processing is performed.

FIG. 10 shows the states of the intermediate representation before and after the library call instruction generation processing is performed.

A state 701 of the intermediate representation is changed to a state 702 by the library call instruction generation processing. The procedure for the library call instruction generation processing is described below.

When the library call instruction detecting unit 140 detects a library call instruction in the intermediate representation state 701, the library call instruction generating unit 150 refers to the library correspondence table. In this example, the library call instruction detecting unit 140 detects "libcall#21(x,y)". Therefore, the library call instruction generating unit 150 targets on the source library information having the identification information "21" and on the target library information specified by the target library information pointer included in the source library information. Here, it is assumed that the library call instruction detecting unit 140 targets on the source library information and target library information shown in FIG. 4.

In this case, because the identification information in the target library information gives #10, the library call instruction generating unit 150 converts the instruction for calling the 21st source library in the intermediate representation into an instruction for calling the tenth target library, that is, into "libcall#10" in the state 702 (step S301). Here, "(U,V)←libcall#10(X,Y,Z)" is represented in an intermediate representation form according to the argument information and the return value information in the target library information 501. Also, "(U,V)←libcall#10(X,Y,Z)" means a description for calling the tenth target library that receives three 4-byte arguments and returns two 4-byte return values. Note that while converting the intermediate representation into machine instructions, the coding/outputting unit 120 converts "(U,V)←libcall#10(X,Y,Z)" into, for instance, an instruction for allocating the three 4-byte arguments to a successive stack area and for setting a stack pointer that specifies the successive stack area and into an instruction for loading the tenth target library into a memory and for passing control to the library.

Then, the argument matching processing unit 151 refers to the argument conversion information of the source library information 401. The first item (#1,#1) of the argument conversion information indicates that the first target argument corresponds to the first source argument (steps S302–S304). Therefore, the argument matching processing unit 151 searches for the definition of the first source argument according to the UD information (step S305) and obtains the definition "x=a". Then, the argument matching processing unit 151 converts the type of the variable "a" and generates an instruction for setting the variable "a" of the converted type as the first target argument (step S306). Here, when converting the type of the variable "a", the argument matching processing unit 151 refers to the argument information of the source library information 401 and of the target library information 501. Because the argument information indicates that the type of the variable "a" should be converted from the short type to the long type, the argument matching processing unit 151 generates an instruction for setting the 2-byte variable "a" at the lower two bytes of the 4-byte variable "X", which is to say the instruction "X=(long)a".

Then, the argument matching processing unit 151 refers to the second item of the argument conversion information of the source library information 401. The second item (#2,0) indicates that the second target argument corresponds to the constant "0" (steps S308, S303, and S304). Therefore, the argument matching processing unit 151 generates an instruction for setting the constant "0" in the 4-byte variable "Y", which is to say the instruction "Y=(long)0" (step S307). Then, the argument matching processing unit 151 refers to the third item of the argument conversion information of the source library information 401. The third item (#3,#2) of the argument conversion information indicates that the third target argument corresponds to the second source argument (steps S308, S303, and S304). Therefore, the argument matching processing unit 151 searches for the definition of the second source argument "y" according to the UD information (step S305) and obtains the definition "y=2". Then, the argument matching processing unit 151 generates an instruction for setting the 2-byte constant "2" at the lower two bytes of the 4-byte variable "Z", which is to say the instruction "Z=(long)2". Because there is no more target argument (steps S308 and S303), the process proceeds to return value processing.

The return value matching processing unit 152 refers to the return value conversion information of the source library information 401. The return value conversion information (#1,#2) shows that the first source return value should be replaced by the second target library return value (step S310). Therefore, the return value matching processing unit 152 searches for the location where the return value "u" is used according to the DU information (step S311) and obtains "c=u" and "d=u". Then, the return value matching processing unit 152 generates an instruction for converting the type of the second target return value "V" and instructions for setting this return value "V" of the converted type in "c" and "d" (step S312). Here, when converting the type of the return value "V", the return value matching processing unit 152 refers to the return value information of the source library information 401 and of the target library information 501. Because the return value information indicates that the type of the return value "V" should be converted from the long type to the char type, the return value matching processing unit 152 generates instructions for setting the lower one byte of the 4-byte return value in the variables "c" and "d", which is to say the instructions "c=(char)V" and "d=(char)V". Note that while converting the intermediate representation into machine instructions, the coding/outputting unit 120 converts c=(char)V and d=(char)V, for instance, into instructions for transferring the lower one byte of one of two 4-byte return values that are successively stored in the stack area specified by a stack pointer to the data area allocated to the 1-byte variables "c" and "d".

In this case, because there is not the second source return value (steps S313 and S310), the library call instruction generation processing is terminated. In this manner, the state 701 of the intermediate representation is converted into the state 702. It should be noted here that the library call instruction generation processing described above is also performed in the case where a source library corresponds to a target function.

<Modification>

The following is a description of a program conversion apparatus where the library correspondence table of the program conversion apparatus 100 is modified. This program conversion apparatus is hereinafter referred to as a "modified program conversion apparatus".

The modified program conversion apparatus converts Java class files so that the Java class files can be executed on specific interpreters. The Java class files are programs in the execution form of the Java language developed by Sun Microsystems, Inc. and run on Java virtual machines. The specific interpreters have instruction sets that are similar to those of the Java virtual machines and have stack architectures.

FIG. 11 shows the library correspondence table of the modified program conversion apparatus.

This figure shows the meaning and example contents of an information set in the library correspondence table. The library correspondence table includes an information set for each piece of source library identification information. Each information set includes source library identification information, source library argument information, source library return value information, target library identification information, target library argument information, and target library return value information.

Here, the library correspondence table of the program conversion apparatus 100 includes the source library table 400 and the target library table 500. However, the library correspondence table of the modified conversion apparatus includes a plurality of pairs of information concerning a source library (that is, information concerning a function in the Java language) and information concerning a target library that has the same feature as the source library (that is, information concerning a function that is executable on a target platform of this modified program conversion apparatus).

The example contents shown in FIG. 11 indicate that the function which is written in the Java language and has the identification number "12" is associated with the function whose identification number is "18" because these functions have the same feature. The former function receives four arguments of the int type and returns a return value of the int type. The latter function receives four arguments of the long type and returns a return value of the boolean type. Here, the identification number assigned to each function is determined in the corresponding execution environment.

Note that unlike the case of the program conversion apparatus 100, it is assumed that the data type in this modification corresponds to the Java language and is, for instance, the int type. Also, it is assumed that the data size of the int type is 32 bits, that of the long type 64 bits, and that of the boolean type one bit.

The modified program conversion apparatus converts programs in the same manner as the program conversion apparatus 100 except that the modified program conversion apparatus refers to the library correspondence table shown in FIG. 11. That is, the modified program conversion apparatus detects each function call instruction in an inputted Java class file, refers to the library correspondence table according to the identification number assigned to the function called by the detected function call instruction, obtains various information, such as the identification number assigned to a function corresponding to the called function, the data type of source arguments, the data type of target arguments, the data type of source return values, and the data type of target return values, and converts the detected function call instruction according to the obtained information.

The conversion of a Java class file by the modified program conversion apparatus is described below using a specific example.

FIG. 12 shows a source program written in the Java language and FIG. 13 shows a Java bytecode.

The source program "field_draw" shown in FIG. 12 is a function (method) written in the Java language. With this source program, a two-dimensional image that is divided into 15×15 blocks is drawn. Each block of this image is drawn by invoking the function (method) "gv_square" included in the drawer class that is prepared as a library.

The Java bytecode shown in FIG. 13 is generated by compiling the source program shown in FIG. 12 and is included in the Java class file that is inputted into the modified program conversion apparatus. Note that the Java bytecode in this drawing is shown in a disassembled form. The feature of each instruction in the Java bytecode is based on the specification of Java class files and each function is called by an instruction "invokestatic".

In this drawing, comments about the contents of the instructions are added to follow the sign "//" as necessary. Also, in this drawing, a label showing the location of each instruction is added at the left of the instruction.

As shown in FIG. 13, in this Java class file, the function "gv_square" is called by "invokestatic #12" labeled with 30. The argument that is passed to call the function is set by pushing onto the operand stack the first argument with the instruction labeled with 20, the second argument with the instruction labeled with 21, the third argument with the instructions labeled with 22–25, and the fourth argument with the instructions labeled with 26–29. The return value of the function is pushed onto the operand stack when the instruction "invokestatic" has been executed and the operation returns to the program that called the function. This return value is used as a comparative object by the comparison instruction labeled with 33.

After receiving this Java class file, the modified program conversion apparatus converts the Java class file by referring to the library correspondence table shown in FIG. 11. Here, in the example contents shown in FIG. 11, the function having the source library identification information "#12" is "gv_square" and the function having the target library identification information "#18" is the function "gv_fine_square" that is a library on the target platform. Accordingly, the modified program conversion apparatus converts the Java class file, so that an instruction for calling the function "gv_square" is converted into an instruction for calling the function "gv_fine_square", the type of the first-fourth arguments is converted from the int type into the long type, these arguments of the converted types are set, the type of the return value returned from the function is converted from the boolean type into the int type, and this return value of the converted type is used. More specifically, as to the arguments, the modified program conversion apparatus detects each instruction for pushing one of the arguments onto the operand stack and adds an instruction for converting the type of the argument pushed onto the operand stack after the detected instruction. As to the return value, the modified program conversion apparatus detects the comparison instruction labeled with 33 for using the return value and adds an instruction for converting the type of the return value pushed onto the operand stack before the comparison instruction.

As a result, the modified program conversion apparatus generates the program shown in FIG. 14.

FIG. 14 shows the program generated by the modified program conversion apparatus as a result of the conversion described above. Note that this drawing shows instructions and information concerning the instructions in the same manner as FIG. 13.

In the program shown in FIG. 14, the function "gv_fine_square" is called by the instruction "invokestatic #18" labeled with 34.

The type of the first argument pushed onto the operand stack with the instruction labeled with 20 is changed from the int type to the long type by the instruction "itol" labeled with 21. In the same manner, the types of the second-fourth arguments are changed from the int type to the long type by the instruction "itol" labeled with 23, 28, and 33, respectively.

The type of the return value that is pushed onto the operand stack as a result of the execution of "gv_fine_square" is changed from the boolean type to the int type by the instruction "btoi" labeled with 37.

As described above, by referring to the library correspondence table shown in FIG. 11, the modified program conversion apparatus converts the Java class file shown in FIG. 13 into a program in the executable form in an execution environment that includes the function "gv_fine_square" instead of the function "gv_square".

<Supplemental Remarks>

The program conversion apparatus of the present invention has been described above by means of the embodiment and the modification, although it should be obvious that the present invention is not limited to the examples described above. Further variations are described below.

(1) The structure of the library correspondence table is not limited to those in the embodiment and the modification (see FIGS. 2, 3, and 11). That is, the structure of the library correspondence table may be changed as long as the library correspondence table gives information concerning correspondences between source arguments and target arguments and correspondences between source return values and target return values. Accordingly, in the library correspondence table shown in FIG. 11, for instance, the source library identification information may give the index of information that specifies the name of the function. Also, the source library argument information and the source library return value information may be combined to give the index of information that specifies types of arguments and return values of the function.

It should be noted here that in the embodiment described above, the library correspondence table stored in the library correspondence table storing unit 160 includes the source library table and the target library table. With this construction, the program conversion apparatus of the embodiment is suitable to have each target library correspond to a plurality of source libraries.

(2) In the embodiment, each library call instruction specifies a library using the identification number assigned to the library. However, identification information in another form, such as ID codes, may be used to specify libraries. In this case, the identification information in the library correspondence table is not expressed using numbers but in the form of the identification information.

Note that the identification information specifying target libraries in the library correspondence table may give ID codes in hexadecimal from 0000 to ffff and ID codes that are greater than or equal to 8000 may indicate target functions.

(3) In the embodiment and the modification, the program conversion apparatus is constructed to cope with various differences between source arguments and target arguments and various differences between source return values and target return values. That is, the program conversion apparatus is constructed to cope with differences between the numbers of source arguments and those of target arguments, differences between identification numbers assigned to source arguments and those assigned to target arguments, differences between data types of source arguments and those of target arguments, differences between the numbers of source return values and those of target return values, differences between identification numbers assigned to source return values and those assigned to target return values, and differences between data types of source return values and those of target return values. However, the program conversion apparatus is not required to cope with all of the stated differences. When there is no difference between data types, for instance, the program conversion apparatus is not required to be constructed to convert data types.

(4) Data types in the embodiment are the 1-byte type, the 2-byte type, and the 4-byte type, and data types in the modification are the int type, the long type, and the boolean type. However, any other data types may be used. For instance, the data type may be the integer type, the signed type, or the floating-point type. Furthermore, the data type where four 2-byte data are calculated in parallel may be used.

(5) In the embodiment, the function definition adding unit 170 stores target functions, which is expressed in an intermediate representation form and is stored in the function definition storing unit 190, into the intermediate representation storing unit 130 (step S208). However, the target functions stored in the function definition storing unit 190 may be machine instructions that are executable on a target platform, instead of an intermediate representation. In this case, step S208 is omitted and the target functions are added after the address resolution necessary for function calls is performed while coding. Also, in the embodiment, every time a library call instruction is detected, it is judged whether a target function should be added. However, identification numbers of all target functions that should be added may be registered in advance and the target functions may be stored in the intermediate representation storing unit 130 by one operation.

Note that for some target platforms, different instructions need to be generated according to whether each object called by library call instructions is an internal module or external program module. When target functions are added as internal modules of such target platforms, the library call instructions that calls the target functions are converted into instructions that call internal modules.

(6) In the embodiment, the types of arguments are converted by referring to the definitions of the arguments according to the UD information. However, when arguments stored in a register are passed to libraries, the types of contents of the register storing the arguments may be converted immediately before instructions that call the libraries are executed. For instance, when an intermediate representation includes an instruction for calling a source library after an argument is stored in a 2-byte register and when an argument stored in a 4-byte register should be passed to a corresponding target library, an instruction for storing the contents of the 2-byte register in the lower 2-byte of the 4-byte register may be added immediately before the library call instruction that calls the corresponding target library.

(7) In the embodiment, the library call instruction generating unit 150 obtains the identification number assigned to the target library corresponding to a source library by referring to the library correspondence table according to the identification number assigned to the source library given by the library call instruction detected in step S204. Then, the library call instruction generating unit 150 generates a library call instruction for calling the target library having the obtained identification number (step S301). However, it may be judged whether the source library specified by the library call instruction detected in step S204 is registered in the library correspondence table. In this case, when the judgement result is negative, a process for outputting an error message showing that the detected source library cannot be converted may be inserted between steps S204 and S301.

(8) In the embodiment, the program conversion apparatus 100 is a binary translator for converting object programs. However, another program conversion apparatus may be achieved using the techniques of the program conversion apparatus 100 for converting library call instructions, argument setting instructions, and return value using instruction. This program conversion apparatus also converts a source program that includes instructions for calling source libraries existing in an execution environment into a source program that includes instructions for calling target libraries which exist in another execution environment and have the same features as the source libraries.

(9) The processing procedure of the program conversion apparatus of the present invention (such as the procedure shown in the flowcharts in FIGS. 6 and 7) may be achieved by a machine language program. This program may be recorded in a recording medium, such as an IC (Integrated Circuit) card, an optical disc, a flexible disc, and a ROM, and be distributed. The recorded program is installed into and is used by a general-purpose computer or a home appliance that can execute programs. That is, a general-purpose computer or a home appliance realizes the program conversion apparatus of the present invention by sequentially executing the installed program.

Also, the computer program for having a general-purpose computer or a household electric perform the processing procedure of the program conversion apparatus of the present invention may be recorded on a recording medium, such as a hard disk, and be distributed via various communication channels.

What is claimed is:

1. A program conversion apparatus for converting a first object program that runs on a first platform into a second object program that runs on the second platform, the first object program including source library call instructions that call source libraries, the source libraries being external modules that are designed to run on the first platform, the program conversion apparatus comprising:

a library correspondence information storing means for holding library correspondence information that associates the source libraries with target libraries and includes argument correspondence information, wherein the target libraries are external modules each of which is capable of running on the second platform and has the same feature as one of the source libraries, and the argument correspondence information shows a correlation between conditions required by source arguments and conditions required by target arguments, the source arguments being arguments of the source libraries and the target arguments being arguments of the target libraries;

a library call instruction detecting means for detecting a source library call instruction included in the first object program;

an instruction converting means for converting the detected source library call instruction into a target library call instruction by referring to the library correspondence information, wherein the target library call instruction is to be included in the second object program and calls a target library corresponding to a source library called by the detected source library call instruction;

an argument setting instruction detecting means for detecting an argument setting instruction included in the first object program, the argument setting instruction setting a value in a source argument of the called source library; and an argument setting instruction converting means for converting the detected argument setting instruction into a target argument setting instruction by referring to the argument correspondence information, wherein the target argument setting instruction is to be included in the second object program and sets the value set in the source argument of the called source library as a target argument of the corresponding target library to meet a condition required by the target argument of the corresponding target library.

2. The program conversion apparatus of claim 1, wherein the argument correspondence information includes target argument type information showing data types that are the conditions required by the target arguments and source argument type information showing data types that are the conditions required by the source arguments, and the argument setting instruction converting means converts, by referring to the target argument type information and source argument type information, the detected argument setting instruction into the target argument setting instruction, wherein the target argument setting instruction converts a data type of the value set by the detected argument setting instruction into a data type of the target argument of the corresponding target library shown by the target argument type information and sets the value of the converted data type as the target argument of the corresponding target library.

3. A program conversion apparatus for converting a first object program that runs on a first platform into a second object program that runs on the second platform, the first object program including source library call instructions that call source libraries, the source libraries being external modules that are designed to run on the first platform, the program conversion apparatus comprising:

a library correspondence information storing means for holding library correspondence information that associates the source libraries with target libraries and includes argument correspondence information, wherein the target libraries are external modules each of which is capable of running on the second platform and has the same feature as one of the source libraries, and the argument correspondence information shows a correlation between conditions required by source arguments and conditions required by target arguments, the source arguments being arguments of the source libraries and the target arguments being arguments of the target libraries;

a library call instruction detecting means for detecting a source library call instruction included in the first object program;

an instruction converting means for converting the detected source library call instruction into a target library call instruction by referring to the library correspondence information, wherein the target library call instruction is to be included in the second object program and calls a target library corresponding to a source library called by the detected source library call instruction;

an argument setting instruction detecting means for detecting an argument setting instruction included in the first object program, the argument setting instruction setting a value in a source argument of the called source library;

an argument setting instruction converting means for converting the detected argument setting instruction into a target argument setting instruction by referring to the argument correspondence information, wherein the target argument setting instruction is to be included in the second object program and sets the value set in the source argument of the called source library as a target argument of the corresponding target library to meet a condition required by the target argument of the corresponding target library; and an internal module linking means for linking the corresponding target library with the second object program as an internal module.

4. A program conversion apparatus for converting a first object program that runs on a first platform into a second object program that runs on the second platform, the first object program including source library call instructions that call source libraries, the source libraries being external modules that are designed to run on the first platform, the program conversion apparatus comprising:

a library correspondence information storing means for holding library correspondence information that associates the source libraries with target libraries and includes return value correspondence information, wherein the target libraries are external modules each of which is capable of running on the second platform and has the same feature as one of the source libraries, and the return value correspondence information shows a correlation between attributes of source return values and attributes of target return values, the source return values being values returned from the source libraries and the target return values being values returned from the target libraries;

a library call instruction detecting means for detecting a source library call instruction included in the first object program;

an instruction converting means for converting the detected source library call instruction into a target library call instruction by referring to the library correspondence information, wherein the target library call instruction is to be included in the second object program and calls a target library corresponding to a source library called by the detected source library call instruction;

a return value using instruction detecting means for detecting a return value using instruction included in the first object program, the return value using instruction using a source return value returned from the called source library; and a return value using instruction converting means for converting the detected return value using instruction into a target return value using instruction by referring to the return value correspondence information, wherein the target return value using instruction is to be included in the second object program, converts a target return value returned from the corresponding target library to conform to an attribute of the returned source return value, and uses the converted target return value.

5. The program conversion apparatus of claim 4, wherein the return value correspondence information includes source return value type information showing data types that are the attributes of the source return values and target return value type information showing data types that are the attributes of the target return values, and the return value using instruction converting means converts, by referring to the source return value type information and target return value type information, the detected return value using instruction into the target return value using instruction, wherein the target return value using instruction converts a data type of the target return value returned from the corresponding target library into a data type of the returned source return value shown by the source return value type information and uses the target return value of the converted data type.

6. A program conversion apparatus for converting a first object program that runs on a first platform into a second object program that runs on the second platform, the first object program including source library call instructions that call source libraries, the source libraries being external modules that are designed to run on the first platform, the program conversion apparatus comprising:

a library correspondence information storing means for holding library correspondence information that associates the source libraries with target libraries and includes target argument type information, source argument type information, and return value correspondence information, wherein the target libraries are external modules each of which is capable of running on the second platform and has the same feature as one of the source libraries, the target argument type information shows data types that are conditions required by target arguments, the target arguments being arguments of the target libraries, the source argument type information shows data types that are conditions required by source arguments, the source arguments being arguments of the source libraries, the return value correspondence information shows a correlation between attributes of source return values and attributes of target return values, the source return values being values returned from the source libraries, and the target return values being values returned from the target libraries;

a library call instruction detecting means for detecting a source library call instruction included in the first object program;

an instruction converting means for converting the detected source library call instruction into a target library call instruction by referring to the library correspondence information, wherein the target library call instruction is to be included in the second object program and calls a target library corresponding to a source library called by the detected source library call instruction;

an argument setting instruction detecting means for detecting an argument setting instruction included in the first object program, the argument setting instruction setting a value in a source argument of the called source library;

an argument setting instruction converting means for converting the detected argument setting instruction into a target argument setting instruction by referring to the target argument type information and source argument correspondence information, wherein the target argument setting instruction is to be included in the second object program, converts a data type of the value set in the source argument of the called source library into a data type of a target argument of the corresponding target library shown by the target argument type information, and sets the value of the converted data type as the target argument of the corresponding target library;

a return value using instruction detecting means for detecting a return value using instruction included in the first object program, the return value using instruction using a source return value returned from the called source library; and a return value using instruction converting means for converting the detected return value using instruction into a target return value using instruction by referring to the return value correspondence information, wherein the target return value using instruction is to be included in the second object program, converts a target return value returned from the corresponding target library to conform to an attribute of the returned source return value, and uses the converted target return value.

7. A program conversion apparatus for converting a first object program that runs on a first platform into a second object program that runs on the second platform, the first object program including source library call instructions that call source libraries, the source libraries being external modules that are designed to run on the first platform, the program conversion apparatus comprising:

a library correspondence information storing means for holding library correspondence information that associates the source libraries with target libraries and includes target argument type information, source argument type information, and return value correspondence information, wherein the target libraries are external modules each of which is capable of running on the second platform and has the same feature as one of the source libraries, the target argument type information shows data types that are conditions required by target arguments, the target arguments being arguments of the target libraries, the source argument type information shows data types that are conditions required by source arguments, the source arguments being arguments of the source libraries, the return value correspondence information shows a correlation between attributes of source return values and attributes of target return values, the source return values being values returned from the source libraries, and the target return values being values returned from the target libraries;

a library call instruction detecting means for detecting a source library call instruction included in the first object program;

an instruction converting means for converting the detected source library call instruction into a target library call instruction by referring to the library correspondence information, wherein the target library call instruction is to be included in the second object program and calls a target library corresponding to a source library called by the detected source library call instruction;

an argument setting instruction detecting means for detecting an argument setting instruction included in the first object program, the argument setting instruction setting a value in a source argument of the called source library;

an argument setting instruction converting means for converting the detected argument setting instruction into a target argument setting instruction by referring to the target argument type information and source argument correspondence information, wherein the target argument setting instruction is to be included in the second object program, converts a data type of the value set in the source argument of the called source library into a data type of a target argument of the corresponding target library shown by the target argument type information, and sets the value of the converted data type as the target argument of the corresponding target library;

a return value using instruction detecting means for detecting a return value using instruction included in the first object program, the return value using instruction using a source return value returned from the called source library;

a return value using instruction converting means for converting the detected return value using instruction into a target return value using instruction by referring to the return value correspondence information, wherein the target return value using instruction is to be included in the second object program, converts a target return value returned from the corresponding target library to conform to an attribute of the returned source return value, and uses the converted target return value; and an internal module linking means for linking the corresponding target library with the second object program as an internal module.

8. A computer-readable recording medium that records a control program for having a computer perform a program conversion process which converts a first object program that runs on a first platform into a second object program that runs on the second platform, the first object program including source library call instructions that call source libraries, the source libraries being external modules that are designed to run on the first platform, wherein the computer stores library correspondence information that associates the source libraries with target libraries and includes argument correspondence information, wherein the target libraries are external modules each of which is capable of running on the second platform and has the same feature as one of the source libraries, and the argument correspondence information shows a correlation between conditions required by source arguments and conditions required by target arguments, the source arguments being arguments of the source libraries and the target arguments being arguments of the target libraries, wherein the program conversion process comprises:

a library call instruction detecting step for detecting a source library call instruction included in the first object program;

an instruction converting step for converting the detected source library call instruction into a target library call instruction by referring to the library correspondence information, wherein the target library call instruction is to be included in the second object program and calls a target library corresponding to a source library called by the detected source library call instruction;

an argument setting instruction detecting step for detecting an argument setting instruction included in the first object program, the argument setting instruction setting a value in a source argument of the called source library; and an argument setting instruction converting step for converting the detected argument setting instruction into a target argument setting instruction by referring to the argument correspondence information, wherein the target argument setting instruction is to be included in the second object program and sets the value set in the source argument of the called source library as a target argument of the corresponding target library to meet a condition required by the target argument of the corresponding target library.

9. A computer-readable recording medium that records a control program for having a computer perform a program conversion process which converts a first object program that runs on a first platform into a second object program that runs on the second platform, the first object program including source library call instructions that call source libraries, the source libraries being external modules that are designed to run on the first platform, wherein the computer stores library correspondence information that associates the source libraries with target libraries and includes target argument type information, source argument type information, and return value correspondence information, wherein the target libraries are external modules each of which is capable of running on the second platform and has the same feature as one of the source libraries, the target argument type information shows data types that are conditions required by target arguments, the target arguments being arguments of the target libraries, the source argument type information shows data types that are conditions required by source arguments, the source arguments being arguments of the source libraries, the return value correspondence information shows a correlation between attributes of source return values and attributes of target return values, the source return values being values returned from the source libraries, and the target return values being values returned from the target libraries;

wherein the program conversion process comprises:

a library call instruction detecting step for detecting a source library call instruction included in the first object program;

an instruction converting step for converting the detected source library call instruction into a target library call instruction by referring to the library correspondence information, wherein the target library call instruction is to be included in the second object program and calls a target library corresponding to a source library called by the detected source library call instruction;

an argument setting instruction detecting step for detecting an argument setting instruction included in the first object program, the argument setting instruction setting a value in a source argument of the called source library;

an argument setting instruction converting step for converting the detected argument setting instruction into a target argument setting instruction by referring to the target argument type information and source argument correspondence information, wherein the target argument setting instruction is to be included in the second object program, converts a data type of the value set in the source argument of the called source library into a data type of a target argument of the corresponding target library shown by the target argument type information, and sets the value of the converted data type as the target argument of the corresponding target library;

a return value using instruction detecting step for detecting a return value using instruction included in the first object program, the return value using instruction using a source return value returned from the called source library; and a return value using instruction converting step for converting the detected return value using instruction into a target return value using instruction by referring to the return value correspondence information, wherein the target return value using instruction is to be included in the second object program, converts a target return value returned from the corresponding target library to conform to an attribute of the returned source return value, and uses the converted target return value.

10. A computer-readable recording medium that records a control program for having a computer perform a program conversion process which converts a first object program that runs on a first platform into a second object program that runs on the second platform, the first object program including source library call instructions that call source libraries, the source libraries being external modules that are designed to run on the first platform, wherein the computer stores library correspondence information that associates the source libraries with target libraries and includes target argument type information, source argument type information, and return value correspondence information, wherein the target libraries are external modules each of which is capable of running on the second platform and has the same feature as one of the source libraries, the target argument type information shows data types that are conditions required by target arguments, the target arguments being arguments of the target libraries, the source argument type information shows data types that are conditions required by source arguments, the source arguments being arguments of the source libraries, the return value correspondence information shows a correlation between attributes of source return values and attributes of target return values, the source return values being values returned from the source libraries, and the target return values being values returned from the target libraries, wherein the program conversion process comprises:

a library call instruction detecting step for detecting a source library call instruction included in the first object program;

an instruction converting step for converting the detected source library call instruction into a target library call instruction by referring to the library correspondence information, wherein the target library call instruction is to be included in the second object program and calls a target library corresponding to a source library called by the detected source library call instruction;

an argument setting instruction detecting step for detecting an argument setting instruction included in the first object program, the argument setting instruction setting a value in a source argument of the called source library;

an argument setting instruction converting step for converting the detected argument setting instruction into a target argument setting instruction by referring to the target argument type information and source argument correspondence information, wherein the target argument setting instruction is to be included in the second object program, converts a data type of the value set in the source argument of the called source library into a data type of a target argument of the corresponding target library shown by the target argument type information, and sets the value of the converted data type as the target argument of the corresponding target library;

a return value using instruction detecting step for detecting a return value using instruction included in the first object program, the return value using instruction using a source return value returned from the called source library;

a return value using instruction converting step for converting the detected return value using instruction into a target return value using instruction by referring to the return value correspondence information, wherein the target return value using instruction is to be included in the second object program, converts a target return value returned from the corresponding target library to conform to an attribute of the returned source return value, and uses the converted target return value; and an internal module linking step for linking the corresponding target library with the second object program as an internal module.

* * * * *